United States Patent [19]

Le Minez et al.

[11] 4,375,498
[45] Mar. 1, 1983

[54] WET-ON-WET COATING PROCESS

[75] Inventors: Jean-Jacques Le Minez, Mennecy; Bernard Schmitt, Compiegne, both of France

[73] Assignee: Peintures Corona S.A., Valenciennes, France

[21] Appl. No.: 286,435

[22] Filed: Jul. 24, 1981

[30] Foreign Application Priority Data

Feb. 9, 1980 [FR] France .................................. 80 18945

[51] Int. Cl.³ .................. B32B 15/08; B05D 1/36; C25D 13/00
[52] U.S. Cl. ........................... 428/416; 204/181 R; 204/181 T; 427/407.1; 427/410; 427/420; 427/421; 427/428; 427/429; 427/430.1; 427/435; 428/413; 428/418; 428/423.1; 428/425.8
[58] Field of Search ..................... 427/407.1, 409, 410, 427/420, 421, 429, 428, 430.1, 435; 204/181 R, 181 T; 428/413, 416, 418, 423.1, 425.8; 260/29.2 EP, 29.4 UA, 29.4 R, 29.2 TN

[56] References Cited

U.S. PATENT DOCUMENTS

4,175,018 11/1979 Gacesa ........................... 204/181 T
4,208,262 6/1980 Kubo et al. ..................... 204/181 T

FOREIGN PATENT DOCUMENTS

49-42655 11/1974 Japan ................................. 427/410
55-2665672 7/1980 Japan .
55-2665772 7/1980 Japan .

*Primary Examiner*—Michael R. Lusignan
*Assistant Examiner*—Thurman K. Page
*Attorney, Agent, or Firm*—William J. Uhl

[57] ABSTRACT

A process for coating a substrate and a coated substrate are disclosed. In a typical embodiment of the invention, a coating composition containing a capped polyisocyanate is first deposited on the substrate followed by applying, before curing the first composition, a second coating composition containing 1,2-epoxy functionality. This method of coating is referred to as wet-on-wet coating. The coated substrate is then heated in one step to cure the multilayered coating.

31 Claims, No Drawings

WET-ON-WET COATING PROCESS

FIELD OF THE INVENTION

The present invention relates to a multilayered coated article and to a process for preparing such article. More particularly, the invention relates to a process for preparing a multilayered coated article in which the coatings are applied via a wet-on-wet technique followed by curing the multilayered coating in one step.

BACKGROUND OF THE INVENTION

Metal surfaces can be protected and given an aesthetic appearance by the application of one or more coats of paint. In the automotive industry, three or more coats are usually applied. These are as follows:
(1) a primer or base coat to provide corrosion protection;
(2) a sealer to provide smoothness and thickness for chip resistance; and
(3) a top coat to provide an aesthetic appearance.

Optionally, the top coat can itself be comprised of two coats, a colored base coat and a clear over coat.

Normally, the primer is aqueous based and applied by electrodeposition in a thickness of about 15 to 20 microns. The sealer can be either organic solvent based or aqueous based and is usually applied to the cured primer coating by spraying in a thickness of about 30 to 40 microns. The top coat can be either organic solvent based or aqueous based and is usually applied by spraying on in a thickness of about 35 to 40 microns over the sealer.

A disadvantage with the coating system described above is each coating application requires a separate curing step. Besides being time consuming, the process also requires considerable energy consumption.

The present invention provides an improvement over the coating procedure described above. Specifically, the invention provides application of the primer and the sealer to the substrate via a wet-on-wet technique in which only one curing step is used to cure both primer and sealer. The process of the invention provides not only good corrosion protection and appearance but can actually provide improved properties such as better water, solvent and chip resistance as compared to similar coatings applied in separate steps with separate curing cycles (dry-on-dry technique).

SUMMARY OF THE INVENTION

In accordance with the present invention, a process for coating a substrate is provided. The process comprises applying to the substrate at least two coating compositions, at least one of which contains capped isocyanate functionality, with no free isocyanate groups, and at least one of which contains 1,2-epoxy functionality. The capped isocyanate functionality and the 1,2-epoxy functionality containing coating compositions are applied to the substrate sequentially without having cured the initially-applied coating. Further, the coating compositions are in a continuous superimposed relationship with one another so as to form a multilayered coating. The coated substrate is heated to a temperature sufficient to cure the multilayered coating.

In a specific embodiment of the invention, the coated substrate is prepared by:

(A) applying to the substrate a first coating composition containing capped isocyanate functionality to form a first coating thereon,
(B) applying to the first coating prior to curing, a second coating composition containing 1,2-epoxy functionality to form a multilayered coating,
(C) heating the coated substrate sufficient to cure the multilayered coating.

The invention also provides for coated articles produced by the above-described processes.

Surprisingly, it has been found that when the multilayered coating is heated to a temperature sufficient to uncap the isocyanate groups, for example, at 150° to 200° C., there appears to be some interaction between the coatings resulting in a cured product. This is surprising because reaction between isocyanates and 1,2-epoxy groups does not occur at such low temperatures. Although not intending to be bound by any theory, what might be occurring is the blocked isocyanate groups under the curing conditions employed might at least in part react with moisture to form amines, for example, toluene diisocyanate might form toluene diamine which is very reactive with 1,2-epoxy functionality under the curing conditions employed.

Brief Description of the Prior Art

Japanese Patent Publication 26657/72 describes a process for coating a substrate involving applying by anionic electrodeposition an amine or an ammonia neutralized carboxylic acid group-containing resin. A second organic solvent-soluble coating composition containing a polyisocyanate is then applied to the first coating via a wet-on-wet technique and the two coatings baked together in one step.

Japanese Patent Publication 26656/72 is similar to 26657/72 mentioned above with the exception that the second coating is based on a polyepoxide. The patents indicate that the curing mechanism is the isocyanate or the polyepoxide in the second coat crosslinking with the carboxylic acid groups in the first coating.

There is no disclosure in either of these two publications of using two coatings, one containing capped isocyanate functionality and one containing 1,2-epoxy functionality as covered by the present invention.

U.S. Pat. No. 4,175,018 to Gacesa discloses a method of coating an article such as a continuous length of flat metal sheet. The method involves placing the metal sheet into an aqueous electrodeposition bath which contains both the water-soluble resins and water-insoluble emulsified resins. The metal sheet is electrocoated and then a top coat is applied to the electrocoat without having previously baked the electrocoat. The metal with the two coatings is then passed to a baking station where both coatings are baked simultaneously. The Gacesa patent discloses a great many coating compositions which can be used for electrocoating. It refers to cationic electrocoating compositions such as described in U.S. Pat. No. 3,984,299 which describes compositions comprising acid-solubilized polyepoxide-amine adducts in combination with fully capped isocyanates. However, there is no teaching in Gacesa of any particular desirability in choosing a capped isocyanate group-containing primer. The one reference to coating compositions which do happen to contain capped isocyanates is included with many other primer coating compositions which do not contain capped isocyanates.

The Gacesa patent also discloses that the top coat can be any of those commonly used such as, for example, acrylics, polyesters, alkyds, epoxy and fluoropolymers. Listing epoxy top coat compositions with many others is no teaching to select epoxy and use it in combination with a blocked isocyanate-containing primer. In addition, although the reference does refer to epoxy top coats, this is often used in the art to refer to coating compositions which are derived from 1,2-epoxy group-containing resins, for example, epoxy esters and epoxy ethers in which the epoxy functionality is consumed by reaction with acids and alcohols and may not even contain 1,2-epoxy functionality.

U.S. Pat. No. 4,208,262 to Kubo et al discloses a process for coating an article comprising subjecting the article to electrodeposition in the bath containing a water-thinnable cationic resin and powdered resin. The coated article is then subjected without hardening of the first coating to an additional electrodeposition in a bath containing an ionic resin (without the powdered resin). The coated article is then baked to effect cross-linking and hardening between the coatings.

The cationic resin of the first coating may be a primary or secondary amine adduct of an epoxy resin which is neutralized with acid. The epoxy resin may be partially esterified or etherified or may be an addition product with isocyanate.

The resin powder can be selected from a wide variety of materials known in powder coating and preference is given to epoxy resins. Hardening agents may be added to the epoxy resin which includes amines, amides, anhydrides, various isocyanates, isocyanurates, urea, melamine resin, amidine, imide and the like, with a blocked isocyanate being preferred.

The second coating can be anionic or cationic with cationic being preferred. Examples of anionic coating compositions include those based on the following resins: maleinized oil resins, polybutadiene resin, epoxy ester resin, acrylic resin, phenol resin or mixtures thereof. As to cationic coating compositions, epoxy resin, epoxyurethane resin, acrylic resin, polyamide resin or mixtures thereof can be used.

Although it would be possible to pick and choose from among the many resins disclosed in U.S. Pat. No. 4,208,262 a primer coat which contains a blocked isocyanate and a second coat which may contain epoxy resin, there is no teaching in the reference for making these selections. There is no disclosed relationship between capped isocyanates in the first coat and 1,2-epoxy functionality in the second coat so that a cured product is obtained.

DETAILED DESCRIPTION

In a preferred embodiment of the invention, the coating composition containing the capped isocyanate is a primer which is applied directly to a substrate, and the coating composition containing the 1,2-epoxy group functionality is a sealer which is applied to the capped isocyanate-containing primer prior to cure.

The primer coating composition can be organic solvent based or preferably aqueous based. Examples of suitable coating compositions for primers which contain capped isocyanate curing agents are described in U.S. Pat. Nos. 3,799,854; 4,031,050; 3,922,253; 4,009,133; 4,038,232; 4,101,486; 3,935,087 and 3,883,483.

A preferred primer coating composition is an aqueous-based system comprising an acid-solubilized polyepoxide-amine adduct in combination with a capped isocyanate curing agent.

The polyepoxides are polymers having a 1,2-epoxy equivalency greater than 1, preferably about 2 or more. Preferred are polyepoxides which are difunctional with regard to epoxy. The preferred polyepoxides are polyglycidyl ethers of cyclic polyols. Particularly preferred are polyglycidyl ethers of polyphenols such as bisphenol A. Examples of polyphenols other than bisphenol A are 1,1-bis-(4-hydroxyphenyl)ethane and 2-methyl-1,1-bis-(4-hydroxyphenyl)propane.

Besides polyphenols, other cyclic polyols can be used in preparing the polyglycidyl ethers of cyclic polyol derivatives. Examples of other cyclic polyols would be alicyclic polyols, particularly cycloaliphatic polyols, such as 1,2-cyclohexanediol, 1,3-bis(hydroxymethyl)cyclohexane and hydrogenated bisphenol A.

Also, oxyalkylated adducts such as ethylene and propylene oxide adducts of these alicyclic polyols and polyphenols mentioned above can be used as the cyclic polyol component.

Examples of other polyepoxides are polyglycidyl ethers of polyhydric alcohols, such as ethylene glycol and propylene glycol.

Polyglycidyl esters of polycarboxylic acids which are produced by reaction of epichlorohydrin or a similar epoxy compound with an aliphatic or aromatic polycarboxylic acid can also be used. Examples of polycarboxylic acids are dicarboxylic acids such as adipic acid and dimerized linoleic acid.

Also, epoxy group-containing acrylic polymers, such as those prepared from reacting glycidyl methacrylate with other copolymerizable vinyl monomers, can be used. The polymers can be prepared via solution polymerization techniques in the presence of a free radical catalyst as shown in U.S. Pat. No. 3,988,281.

The polyepoxides such as the preferred polyglycidyl ethers of cyclic polyols can be further reacted to chain extend and increase their molecular weight. For example, they may be further reacted with active hydrogen-containing materials which are reactive with the epoxy groups such as those containing primary hydroxy groups. Examples of chain extenders are polymeric polyols such as polyester polyols including polylactone polyols. Chain extending of epoxy-containing polymeric materials with polymeric polyols is disclosed in U.S. Pat. No. 4,148,772 to Marchetti, Zwack and Jerabek and assigned to PPG Industries, Inc.

The organic amine which is reacted with the polyepoxide can be ammonia, primary, secondary or tertiary amines or mixtures thereof. To introduce cationic salt groups into the epoxy-amine adduct, the polyepoxide-amine adduct is at least partially neutralized to form amine salts in the case of ammonia, primary and secondary amines, and quaternary ammonium salts in the case of tertiary amine.

The preferred amines are monoamines. Polyamines such as ethylene diamine and piperizine can be used but their use is not preferred because they are multifunctional with regard to amine and have a greater tendency to gel the reaction mixture than monoamines.

Secondary and tertiary amines are preferred to primary amines because the primary amines are difunctional and have a greater tendency to gel the reaction mixture.

Examples of suitable monoamines are mono, dialkyl and trialkyl amines and mixed alkyl-aryl amines and substituted amines in which the substituents do not detrimentally affect the polyepoxide-amine reaction. Specific examples of these amines are ethylamine and diethylamine. Examples of substituted amines are hydroxyl-containing amines such as alkanolamines, dialkanolamines, alkyl alkanolamines and aryl alkanolamines containing from 2 to 18 carbon atoms, in the alkanol, alkyl and aryl chains. Specific examples include ethanolamine, N-methylethanolamine, diethanolamine and N-phenylethanolamine.

Mixtures of the various amines described above can be used. The reaction of the amines with the polyepoxide takes place upon mixing the amine with the polyepoxide. The reaction can be conducted neat or optionally in the presence of a suitable organic solvent. The reaction may be exothermic and cooling may be desired. However, heating at moderate temperature, that is, within the range of 50° to 150° C., may be used to hasten the reaction.

The reaction product of the amine with the polyepoxide attains its cationic character by at least partial neutralization, for example, by treating with an acid, to form secondary or tertiary amine salts. Examples of suitable acids include organic and inorganic acids such as formic acid, acetic acid, lactic acid and phosphoric acid. The extent of neutralization will depend upon the particular product involved. It is only necessary that sufficient neutralizing agent be used to solubilize or disperse the product in water. Typically, the amount of neutralizing agent used will be sufficient to provide at least 30 percent of the total theoretical neutralization.

In addition to the amines disclosed above, a portion of the amine which is reacted with the polyepoxide can be a ketimine or a polyamine. This is described in U.S. Pat. No. 4,104,147 in column 6, line 23, to column 7, line 23. The ketimine groups will decompose upon dispersing the polyepoxyamine adduct in water resulting in free primary amine groups which would be reactive with a curing agent which are described in more detail below.

In general, most of the cationic polymers useful in the practice of the invention have average molecular weights (calculated values) within the range of 500 to 5000, preferably about 1000 to 3000, and contain from about 0.1 to 3.0, preferably from about 0.3 to 1.0 milliequivalents of cationic nitrogen per gram of resin solids. Obviously, one must use the skill in the art to couple the molecular weight of the cationic group content to arrive at a satisfactory polymer.

In the preparation of the capped organic polyisocyanate, any suitable organic polyisocyanate may be used. Representative examples are aliphatic compounds such as trimethylene and tetramethylene diisocyanate; cycloalkylene compounds such as 1,4-cyclohexane diisocyanate; aromatic compounds such as p-phenylene diisocyanate; aliphatic-aromatic compounds such as 4,4'-diphenylene methane diisocyanate, 2,4- or 2,6-tolylene diisocyanate or mixtures thereof. Higher polyisocyanates can be employed such as triisocyanates. Examples include triphenylmethane-4,4',4"-triisocyanate.

Any suitable aliphatic, cycloaliphatic, aromatic alkyl monoalcohol and phenolic compound may be used as a capping agent in accordance with the present invention, such as, for example, lower aliphatic alcohols containing from 1 to 4 carbon atoms, such as ethanol and n-butyl alcohol; cycloaliphatic alcohols such as cyclohexanol; aromatic-alkyl alcohols such as phenylcarbinol and methylphenylcarbinol; phenolic compounds such as phenol itself, substituted phenols in which the substituents do not adversely affect the coating operations. Examples include cresol and nitrophenol. Minor amounts of even higher molecular weight, relatively non-volatile mono-alcohols may be used, if desired, to serve as plasticizers in the coatings provided by this invention.

Additional capping agents include oximes such as methyl ethyl ketoxime and cyclohexanone oxime and lactams such as epsilon-caprolactam. Use of oximes and lactams is particularly desirable because the polyisocyanates blocked with these agents unblock and react at relatively low temperatures.

The polyisocyanate curing agent can be used in two similar ways. The polyisocyanate can be fully capped, that is, no free isocyanate groups remain, and then added to the acid-solubilized polyepoxide-amine adduct to form a two-component system. Or, the polyisocyanate can be partially capped, for example, half-capped diisocyanate so that the reactive isocyanate groups remain. The partially capped isocyanate can then be reacted with the polyepoxide through active hydrogen functionalities, i.e., hydroxyl, present in the polyepoxide under conditions which will not unblock the isocyanate. This reaction in effect fully caps the isocyanate making it a part of the polymer molecule and a one-component system. Two-component systems are preferred and are described in U.S. Pat. No. 4,031,050. One-component systems are described in U.S. Pat. No. 3,922,253. Normally, the capped isocyanate-containing composition will contain at least 2, preferably from 2 to 10, more preferably from 2.5 to 7 percent capped isocyanate functionality based on weight of isocyanate.

The resinous products of the invention are usually prepared so that all the epoxy functionality has been consumed. However, when dispersed in water, any residual epoxy functionality will eventually be hydrolyzed.

Aqueous dispersions of the above-described resinous products are particularly suited to application by electrodeposition, although they may also be applied by conventional coating techniques.

The term "dispersion" as used within the context of the present invention is believed to be a two-phase translucent or opaque aqueous resinous system in which the resin is the dispersed phase and water the continuous phase. The average particle size diameter of the resinous phase is generally less than 10 and preferably less than 5 microns. Particles may be spherical or elongated or invisible by microscopic investigation. The term "dispersion" is also intended to cover homogeneous aqueous solutions which appear optically clear.

The concentration of the resinous products in the aqueous medium depends upon the process parameters to be used and is, in general, not critical, but ordinarily the major portion of the aqueous dispersion is water. For example, the aqueous dispersion may contain from about 2 to 75 percent by weight resin solids.

Besides water, the aqueous medium may contain a coalescing solvent. The use of coalescing solvents provides in some instances for improved deposited film appearance. These solvents include hydrocarbons, alcohols, esters, ethers and ketones. The preferred coalescing solvents include monoalcohols, glycols and polyols as well as ketones and ether alcohols. Specific coalescing solvents include isopropanol, butanol, isophorone, 4-methoxy-methylpentanone-2, ethylene and propylene glycol, the monoethyl, monobutyl and monohexyl ethers of ethylene glycol and 2-ethylhexanol. The amount of coalescing solvent is not unduly critical and generally is between about 0.1 and 40 percent by weight, preferably about 0.5 to about 25 percent by weight based on total weight of the aqueous medium.

In most instances, a pigment composition and, if desired, various additives such as surfactants or wetting agents are included in the dispersion. The pigment compositions may be of any conventional type, comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as pigment-to-resin ratio. In the practice of the present invention, pigment-to-resin ratios within the range of about 0.05 to 0.5:1 are usually used. The other additives mentioned immediately above are present in the dispersion in amounts of about 0.01 to 3 percent by weight based on total weight of resin solids.

In the electrodeposition process employing the aqueous dispersion described above, the aqueous dispersion is placed in contact with an electrically conductive anode and an electrically conductive cathode with the surface to be coated being the cathode. While in contact with the aqueous dispersion, an adherent film of the coating composition is deposited on the cathode when a voltage is impressed between the electrodes.

The conditions under which electrodeposition is carried out are, in general, similar to those used in electrodeposition of other types of coatings. The applied voltage may be varied greatly and can be, for example, as low as one volt or as high as several thousand volts, but typically between about 50 and 500 volts. The current density is usually between 1.0 ampere and 15 amperes per square foot and tends to decrease during electrodeposition, indicating the formation of a self-insulating film.

It is desirable to electrodeposit these coatings from a dispersion having a pH between 3 and about 9.

Although application of the capped isocyanate group-containing coating composition to a substrate has been specifically described in terms of electrodeposition of aqueous-based cationic coating compositions, it should be appreciated the invention is also applicable to aqueous-based anionic coating compositions, which can also be applied by electrodeposition, and to non-ionic aqueous coating compositions and organic solvent-based coating compositions which can be applied by non-electrophoretic means.

Besides electrodeposition, the coating composition can be applied to the substrate by any conventional coating method such as dip, spray, brush or roll coating. Usually the primer coating will have a thickness of about 5 to 30, preferably 10 to 20 microns.

The primer can be used on many substrates. For automotive applications, steel is the usual substrate and can be untreated steel or can be pretreated steel such as steel which has been treated with an iron phosphate or zinc phosphate pretreatment as is well known in the art. Besides steel, other metals can of course be used such as aluminum, copper, magnesium and alloys thereof. Other substrates can be used which are not adversely affected by the ingredients in the coating composition or by the baking operations and include, for example, glass, ceramics, wood and plastics. Examples of plastics include elastomeric plastics such as high density polyurethane foam which is used in making elastomeric parts for automobiles.

After the capped isocyanate group-containing primer has been applied to the substrate, the sealer which contains a 1,2-epoxy group-containing resin is applied to the primer without having previously cured the primer. By the term "sealer" is meant coating compositions which contain no or relatively low amounts of pigments. Also, sealer is meant to describe compositions with higher pigment loadings which, when applied over primers, are referred to as primer-surfacers.

The resinous binder in the sealer should be at least in part a 1,2-epoxy group-containing resin. If the epoxy resin is the sole resinous binder, it should be a film-forming 1,2-epoxy group-containing resin. Alternately, if the epoxy resin is used in combination with another resinous ingredient, the combination should form a film-forming resinous binder. Examples of other resinous ingredients are drying oils, alkyd resins, saturated polyester resins, polyurethane resins such as poly(ester-urethane) resins and acrylic resins.

Examples of suitable epoxy resins are those mentioned above in connection with the preparation of primer compositions with the polyglycidyl ethers of cyclic polyols being preferred. The molecular weight of the polyepoxides is preferably at least about 350, more preferably at least 800, in order for the development of optimum chip resistance and solvent resistance. More preferably, the molecular weight will be between 800 and 30,000. Lower molecular weights where possible are calculated values, whereas higher molecular weights which cannot be calculated are values based on gel permeation chromatography using a polystyrene standard and are an indication of a weight average molecular weight. Also, the polyepoxide contains a 1,2-epoxy functionality greater than 1, preferably at least 1.4, and more preferably at least 2.

The drying oils are esters of fatty acids which can be obtained from a naturally occurring source or which can be obtained by reacting a fatty acid with a polyol. The drying oils all contain at least a portion of polyunsaturated fatty acids. The drying oils are those oils which have an iodine value of about 85 and 185 as determined by ASTM D-1467 and thus include the so-called semi-drying oils.

Examples of suitable naturally occurring drying oils are linseed oil, soya oil, safflower oil, perilla oil, tung oil, oiticica oil, poppyseed oil, sunflower oil, tall oil esters, walnut oil, castor oil, dehydrated castor oil, herring oil, menhaden oil, sardine oil and the like.

Examples of drying oils obtained by reacting fatty acids with polyols include the reaction of fatty acids such as oleic, linoleic and linolenic acids with various polyols such as 1,4-butanediol, glycerol, trimethylolpropane, pentaerythritol and sorbitol.

The drying oils can be modified with other acids, including saturated, unsaturated or aromatic acids such as adipic acid, maleic acid and phthalic acid. The acid-modified oils are made by transesterification of the ester such as by forming a di or monoglyceride by alcoholysis followed by esterification with a modifying acid.

An alkyd resin is a product obtained by reacting a mixture of a dibasic and/or a tribasic acid and a fatty acid with a polyol. Typical polybasic acids include phthalic acid, maleic anhydride and trimellitic anhydride. Typical fatty acids include linoleic or linolenic acid or drying oils such as the drying oils mentioned above. Typical polyols include ethylene glycol, glycerol, trimethylolpropane, pentaerythritol and sorbitol.

Saturated polyester resins are formed from saturated or aromatic polycarboxylic acids and a polyol. Typical saturated aliphatic polycarboxylic acids are those which contain from about 2 to 10 carbon atoms such as succinic acid, azelaic acid and adipic acid. Examples of aromatic polycarboxylic acids are phthalic acid and trimellitic acid. Many polyols can be reacted with the aforementioned acids to form the desired saturated polyesters. Particularly useful are diols such as ethylene glycol, 1,4-butanediol, neopentyl glycol, sorbitol, pentaerythritol and trimethylolpropane.

The acrylic polymer which is used in the practice of the invention is prepared by free radical initiated polymerization of a mixture of copolymerizable acrylic monomers by solution polymerization techniques.

The mixture of acrylic monomers can be selected from a very wide variety of polymerizable acrylic monomers. Examples include vinyl aromatic monomers such as styrene and vinyl toluene; alkyl esters of acrylic and methacrylic acid containing from about 1 to 20 carbon atoms in the alkyl group such as methyl methacrylate, 2-ethylhexyl acrylate and butyl methacrylate; acrylic monomers containing active hydrogens, particularly hydroxyl groups such as hydroxyalkyl acrylates or methacrylates such as hydroxyethyl acrylate, hydroxyethyl methacrylate and hydroxypropyl acrylate and an alpha, beta-ethylenically unsaturated carboxylic acid such as acrylic acid or methacrylic acid.

As mentioned above, the sealer composition preferably comprises a mixture of an epoxy resin with one or more resins such as those mentioned immediately above. Preferably, the epoxy resin will constitute from about 40 to 100 percent by weight of the resinous binder and the other resin from about 0 to 60 percent by weight. The percentages will vary depending upon the identities of the epoxy resin and the other resinous binder and desired thickness and properties of the coating. The working examples which follow show typical sealer compositions.

The sealer compositions can be aqueous based or solvent based, with solvent-based compositions being preferred. To make aqueous-based compositions, the sealers are usually provided with ionized groups or with groups which can readily be converted to ionized groups, for example, an acrylic resin or an alkyd resin is prepared with unreacted carboxylic acid groups which can be neutralized with a base such as an amine and the resultant product dispersed in aqueous medium. For solvent-based compositions, the resins are dissolved in suitable solvents. Depending upon the resinous binders used, suitable solvents would be aliphatic, cycloaliphatic and aromatic hydrocarbons, esters, ethers, ketones and alcohols such as are conventionally used in coating compositions. Examples include toluene, xylene, butyl acetate, 2-butoxyethylacetate, 2-ethoxyethanol, 2-butoxyethanol, acetone, methyl isobutyl ketone and butyl alcohol. Generally, the resin solids of the sealer composition will be at least 40 percent by weight.

The sealer compositions can also contain pigments and adjuvant materials which are well known in the art. Examples of pigments will be those mentioned above in connection with formulating the primer compositions. Usually, the pigmentation of the sealer will be up to about 30 percent pigment volume concentration.

Examples of adjuvant materials would include thickening agents, anti-foaming agents, adhesion additives, coalescing acids, and the like. The amount of the adjuvant material which would be employed in the sealer composition will generally be no more than about 2 percent by weight based on total weight of the sealer.

Besides the optional ingredients mentioned above, a curing agent such as an amine or an amide-aldehyde condensate can optionally be included in the formulation. However, since application of the sealer to the primer via the wet-on-wet technique of the invention produces an excellently cured product upon heating without a curing agent, there is no need to include any curing agent in the sealer compositions.

For application of the sealer composition to the primer via the wet-on-wet technique of the invention, the primer is usually applied as generally described above and then before the primer is cured, the sealer is applied. Preferably, the primer is air dried or is heated to an elevated temperature for a short period of time sufficient to dry the primer coating but insufficient to cure the product. If elevated temperature is used in the drying step, care should be taken so as not to uncap the isocyanates which will result in curing of the primer coating and the insufficient development of physical properties which are obtained in the invention. The temperature of drying will be determined principally by the isocyanate used, its blocking agent and the presence of catalyst. As is well known in the art, these factors determine at what temperature the isocyanate will unblock. The working examples which follow show drying schedules which can be used with particular capped isocyanate group-containing coating compositions. Typically, drying schedules of 130° C. for 10 minutes or less can be used.

In the specification and claims where it is indicated that the coating compositions are applied sequentially without having first cured the initially applied coating, the following is intended: That in the initially applied coating, there will be sufficient functional groups, for example, capped isocyanate groups, present for subsequent curing with the sequentially applied coating. By curing is meant the composite coating will develop better physical properties as the curing process proceeds. Examples of better physical properties are solvent resistance, hardness and chip resistance.

Usually, the sealer is applied by spraying over the primer composition, although it can be applied by other conventional coating techniques such as brushing, roll coating, drawing down and the like. Spraying, however, is preferred in that it gives the best appearing coating system. Usually, the sealer will have a coating thickness of about 20 to 50, preferably 25 to 45 microns.

After the sealer has been applied, the coating system is generally cured by heating to an elevated temperature for a sufficient period of time so as to result in a solvent-resistant coating. The time and temperature of cure will depend upon the identity of capped isocyanate curing agent and the presence of catalysts in the primer composition. Typically, the curing can be conducted at a temperature of from about 150° to 400° C. for about 15 to 45 minutes.

For automotive coatings, a top coat is usually applied to the sealer coat. Top coats are well known in the art and may be either aqueous based or organic solvent based. Also, the top coat may be thermoplastic or thermosetting in nature. The top coat may be a clear-over-color system which involves a pigmented or colored base coat which is overcoated with a non-pigmented or clear top coat.

Examples of some suitable top coat compositions are those based on acrylic polymers, drying oils, alkyd resins, saturated polyester resins, 1,2-epoxy group-containing resins and polyurethane resins, as well as mixtures thereof. Examples of such polymers are those described above.

Top coats are usually pigmented for the purposes of providing color. Examples of pigments include those described above and metallic pigments such as aluminum, copper and bronze. Normally, the pigment-to-binder ratio will be within the range of about 0.1 to 1.5:1.

The top coat composition can be aqueous based or solvent based, with the solvent basis currently being the most preferred. Examples of suitable solvents and diluents which can be used are those mentioned above.

Top coat compositions can be applied to the sealer by brushing, spraying, dipping, flow coating and the like. It is preferred, however, that the technique of spraying be used.

Normally, the top coat will be cured in the range of about 180° F. to about 400° F. (82° C. to 204° C.) and preferably from about 225° F. to about 280° F. (107° C. to 138° C.) for about 10 to 40 minutes.

The top coating composition can be applied to the sealer coat after the sealer itself has been completely cured or alternately, the sealer coat can be merely dried such as by air drying or flashing the sealer for about 30 seconds to 10 minutes at a temperature less than 130° C. and the top coat applied to the sealer and the entire system then cured at the elevated temperature mentioned above. Usually, the top coat will have a thickness from about 20 to 50, preferably 25 to 45 microns.

The top coat composition can be a single coat such as generally described above or alternately, a clear-over-color system of a colored base coat overcoated with a clear top coat. Examples of such systems are described in U.S. Pat. No. 3,639,147.

In general, the top coat compositions generally described above can be used for formulating the colored base coat. The clear top coat can be formulated with resins such as generally described above but with no pigments. In clear-over-color systems, the colored base coat is usually applied to the sealer coat via a wet-on-wet technique or applied to a previously cured sealer coat. The colored base coat is then subjected to curing temperatures as generally described above. Alternately, the clear top coat can be applied to the colored base coat via a wet-on-wet technique and the entire coating system cured at elevated temperature.

Although the invention has been particularly described with regard to a primer-sealer combination, the reactive coating system could be other combinations such as a sealer-top coat combination. For example, a sealer composition containing a capped isocyanate group can be applied to a previously cured primer and the top coat coating composition containing a 1,2-epoxy resin could be applied via a wet-on-wet technique to the sealer.

Also, clear-over-color top coats could use the method of the invention. For example, the colored base coat could contain capped isocyanate groups and the clear overcoat could contain a 1,2-epoxy resin and be applied to the base coat via a wet-on-wet technique.

Also, sealers as described above do not have to be used and the top coat applied wet-on-wet to the primer. For example, a top coat composition containing 1,2-epoxy resins could be applied wet-on-wet to an NCO group-containing primer and the system cured in one step. In a clear-over-color system, a 1,2-epoxy resin colored base coat could be applied wet-on-wet to an NCO group-containing primer and the multilayered coating cured. A clear overcoat could then be applied to the cured base coat layer and the clear overcoat cured in a separate step.

Although the invention has been particularly described in connection with automotive coatings, it should be appreciated that the invention is applicable to coatings for other industries such as appliance and general industrial industries.

Further illustrating the invention are the following examples which are not to be construed as limiting the invention as to scope or details unless otherwise indicated. All parts and percentages in the Examples as well as throughout this specification are by weight unless otherwise indicated.

EXAMPLES

PRIMERS

Example A

Example A is a cationic electrodepositable primer composition based on an acid-solubilized polyepoxide-amine adduct and fully blocked organic polyisocyanate curing agent prepared as generally described in U.S. Pat. No. 4,031,050. The composition contains about 3.70 percent by weight latent NCO functionality.

Example B

Example B is a cationic electrodepositable primer composition similar to Example A above but containing only 2.48 percent by weight of latent NCO functionality.

Example C

Example C is a cationic electrodepositable primer composition in which the resin binder is believed to be prepared as generally described in DE-OS No. 2,752,255. The product contains about 5 percent by weight of latent NCO functionality and is available from Kunstharz as RESYDROL SVK.

Example D

Example D is an anionic electrodepositable primer composition in which the resinous binder is a polyglycidyl ether of bisphenol (epoxy equivalent weight of about 875–1000) tall oil fatty acid adduct which has been neutralized with dimethylethanolamine.

EXAMPLE E

Example E is a solvent-based primer comprising 50 parts by weight of a styrene-allyl alcohol copolymer having a hydroxyl value of 0.45 equivalents of OH per 100 grams of copolymer commercially available from the Monsanto Company as RJ 101, 50 parts by weight of 2-ethylhexanol fully blocked toluene diisocyanate, 80 parts by weight of xylene and a small amount of a tin catalyst.

Example F

Example F is a cationic electrodeposition primer based on an acid-solubilized polyepoxide-amine adduct and a polyester curing agent prepared as generally described in Example V of European Patent Application 012463. The polyester crosslinking agent was an adduct of trimellitic anhydride and the glycidyl ester of Versatic acid (CARDURA E).

SEALERS

Example G

Example G is a sealer composition based on a mixture of a castor oil-based alkyd resin and an epoxy resin. The weight ratio of alkyd to epoxy resin was 40/60 on a resin solids basis. The sealer is pigmented with $TiO_2$, barium sulfate and mica. The castor oil-based alkyd has an iodine value of 30 and a hydroxyl value of 90 (measured as an 80 percent resin solution in 2-ethoxyethyl acetate). The epoxy resin is a polyglycidyl ether of bisphenol A having an epoxy equivalent weight of about 485 (EPON 1001).

The sealer had a solids content of 60 percent, a pigment-to-binder ratio of 1 and a Ford cup viscosity of 30 seconds measured with a No. 4 Ford cup at 20° C.

Example H

Example H is a sealer composition similar to Example G but having a solids content of 58 percent, pigment-to-binder ratio of 0.9 and a weight ratio of alkyd to epoxy of 40/60.

Example I

Example I is a sealer composition based on a mixture of 40 percent by weight castor oil-based alkyd resin, 15 percent by weight soya oil-based alkyd resin, 20 percent by weight of an aminoplast resin and 25 percent by weight of an epoxy resin; the percentages by weight being based on total weight of the resinous ingredients. The sealer is pigmented with titanium dioxide, barium sulfate and mica.

The castor-oil based alkyd has an iodine value of 35 and a hydroxyl value of 105 (measured as an 80 percent resin solution). The soya oil-based alkyl has an iodine value of 30 and a hydroxyl value of 70 (measured as an 80 percent resin solution). The aminoplast was a butylated urea-formaldehyde condensate. The epoxy resin was a polyglycidyl ether of bisphenol A having an epoxy equivalent weight of about 500.

The sealer had a solids content of 72 percent, a pigment-to-binder ratio of 1.06 and a No. 4 Ford cup viscosity of 80 seconds measured at 20° C.

Example J

Example J is a sealer composition based on a mixture of 32 percent by weight castor oil-based alkyd resin of Example I, 9.5 percent by weight soya oil-based alkyl resin of Example I, 9.5 percent by weight of a polyether, 4.5 percent by weight of a blocked isocyanate, 25.5 percent by weight of an aminoplast resin, 14 percent by weight of a polyglycidyl ether of bisphenol A having an epoxy equivalent of about 500 and 5 percent of a polyglycidyl ether of bisphenol A having an epoxy equivalent of about 185. The polyether was a poly(oxytetramethylene) glycol having a molecular weight of 1000. The blocked isocyanate was an aliphatic polyisocyanate (average NCO functionality of 3) commercially available from Bayer Aktiengesellschaft as DESMODUR N fully blocked with methyl ethyl ketoxime. The aminoplast was mixed melamine-urea-formaldehyde condensate.

The sealer had a solids content of 60 percent, was pigmented as in Example I, had a pigment-to-binder ratio of 0.83, and a No. 4 Ford cup viscosity of 50 seconds.

Example K

Example K is an anti-gravelometer coating composition based on a mixture of 52.7 percent by weight urethanized polyester, 10.8 percent by weight polyether of Example J, 19 percent by weight epoxy resin of Example I and 17.5 percent by weight of a melamine-formaldehyde condensate. The coating composition was pigmented with titanium dioxide, barium sulfate, kaolin and talc. The urethanized polyester had a hydroxyl value of 15 (measured as a 55 percent resin solution).

The coating composition had a solids content of 54 percent, a pigment-to-binder ratio of 1.11.

Example L

Example L is an anti-gravelometer coating composition based on a mixture of 57 percent by weight of a urethanized polyester of Example K, 6 percent by weight of a polyether of Example I, 19 percent by weight of a polyglycidyl ether of bisphenol A having an epoxy equivalent of about 185, and 18 percent by weight of a methylated melamine-formaldehyde condensate. The coating composition was pigmented as in Example K.

The coating composition had a solids content of 60 percent and a pigment-to-binder ratio of 1.08 and a No. 4 Ford cup viscosity of 60 seconds at 20° C.

Example M

Example M is a sealer composition based on a mixture of an alkyd resin, an epoxy resin and an aminoplast. The sealer was pigmented with titanium dioxide and barium sulfate. The sealer had a solids content of 60 percent, a pigment-to-binder ratio of 0.9 and a No. 4 Ford cup viscosity of 90 seconds.

Example N

Example N is a 40 percent by weight solution in 2-butoxyethanol of EPON 1001 (epoxy equivalent weight of about 485).

Example O

Example O is a 50 percent by weight solution in 2-butoxyethanol of styrene-allyl alcohol copolymer having an OH value of 0.45 equivalents of OH per 100 grams of copolymer commercially available from Monsanto Company as RJ-101.

Example P

Example P is a 40 percent by weight solution in 2-butoxyethanol of ammonia defunctionalized epoxy resin (polyglycidyl ether of bisphenol A) which had an epoxy equivalent of 2372 before reaction with ammonia.

Example Q

Example Q is a 50 percent by weight solution in 2-butoxyethanol of EPON 1001 (epoxy equivalent of 485).

Example R

Example R is a sealer composition prepared by stirring together 200 parts by weight (150 parts by weight solids) of EPON 1001 (epoxy equivalent weight of 485), 100 parts of butyl acetate and 50 parts of ASP 170 clay. The mixture was thinned to 10 percent solids with butyl acetate.

Example S

Example S is a sealer composition obtained by defunctionalizing 50 parts by weight of EPON 1001 (epoxy equivalent weight of 500) with 9.4 parts of phenol. The defunctionalized reaction product was thinned with 26 parts of butyl acetate and then combined with 19.8 parts by weight of ASAP 170 clay.

Example T

Example T is a sealer composition in which the resinous binder was prepared by solution polymerizing 40 percent butyl acrylate, 15 percent styrene, 15 percent methyl methacrylate, 15 percent hydroxypropyl methacrylate and 15 percent glycidyl methacrylate; the percentages by weight being based on total weight of monomers. The monomers were polymerized in a 1/11/18 mixture of water, 2-phenoxyethanol and 2,2,4-trimethylpentane-1,3-diol monoisobutyrate solvent in the presence of 2-t-butylazo-2-cyanobutane initiator. The reaction product contained 75 percent polymer solids. The reaction product (52 parts by weight) was mixed with 26 parts by weight of butyl acetate and 13 parts by weight of ASP 170 clay.

TOP COATS

Example U

Example U is a non-aqueous acrylic polymer white coating composition with an aminoplast curing agent. The coating composition had a solids content of 66 percent, a pigment-to-binder ratio of 1 and a No. 4 Ford cup viscosity of about 40 seconds.

Example V

Example V is a color-plus-clear system in which the colored base coat contains aluminum pigment plus colored pigments in a resinous binder comprising a polyester resin and an aminoplast resin. The base coat had a solids content of 37 percent and a pigment-to-binder ratio of about 0.15. The clear coat is a 40 percent resin solids solution of an acrylic resin and an aminoplast curing agent.

Example I

The following example compares three coating systems for hardness and solvent resistance. One coating system involved a blocked isocyanate group-containing primer and a sealer applied to the primer via a wet-on-wet technique and the multilayered coating cured in one step. The second coating system was similar but one in which the sealer was applied over the primer via a dry-on-dry technique, that is, the primer was first cured before application of the sealer and the sealer cured in a second step. The third coating was simply the sealer applied directly to the substrate and cured without having first applied a primer. The substrate was an iron phosphated pretreated steel panel. The results of the testing are summarized in Table I below:

TABLE I

| Test | Coating System | | |
|---|---|---|---|
| | Sealer of Example G[3] | Primer of Example A[4] Cured 19 Minutes at 200° C. + Sealer of Example G[3] | Primer of Example A[4] Dried 5 Minutes at 130° C. + Sealer of Example G[3] |
| Persoz Hardness[1] in seconds | 290 | 290 | 310 |
| Solvent Resistance[2] | 10 seconds | 30 seconds | 5 minutes |

[1]Persoz hardness determined according to AFNOR NT 30-016; the higher the value, the higher the hardness.
[2]Solvent resistance was determined by placing a drop of solvent on the cured coating and measuring the time for the coating to soften. The solvent was the following mixture:

| Ingredient | Percent by Weight |
|---|---|
| Acetone | 46 |
| 2-hydroxyethyl acetate | 34 |
| Toluene | 12 |
| Xylene | 8 |

[3]The sealer was spray applied and cured for 19 minutes at 200° C.; thickness 35 microns.
[4]Cationic electrodeposition primer applied to the substrate from a 20 percent solids electrodeposition bath at 280 volts for 2 minutes, bath temperature 25° C., coating thickness 15–18 microns.

Example II

The following example compares six different coating systems for chip resistance. Two coating systems involved the application of an epoxy resin group-containing sealer to a blocked isocyanate group-containing primer via a wet-on-wet technique. Four coating systems involved application of an epoxy resin group-containing sealer to a previously cured blocked isocyanate group-containing primer, that is, via a dry-on-dry technique. In two of the coating systems, an anti-gravelometer coating was used between the primer and the sealer. The results of the testing are presented in Table II below:

TABLE II

| Application Method Coating | Dry-On-Dry | | | | Wet-On-Wet | |
|---|---|---|---|---|---|---|
| Primer | Ex. A[1] | Ex. A[1] | Ex. A[1] | Ex. A[1] | Ex. A[2] | Ex. A[2] |
| Anti-gravelometer coating | No | No | No | Ex. K[3] | No | Ex. L[3] |
| Sealer | Ex. M[4] | Ex. I[4] | Ex. J[4] | Ex. I[4] | Ex. H[4] | Ex. I[4] |
| Top Coat | Chip Resistance[7] | | | | | |
| Ex. U[5] | Bad 7 | Fair 5 | Good 3 | Fair 6 | Good 1 | Good 4 |
| Ex. V[6] | Fair 7 | Fair 6 | Good 3 | Good 4 | Good 1 | Fair 5 |

[1]Electrodeposition primer applied to iron phosphate pretreated steel substrate from 20 percent solids electrodeposition bath at 280 volts for 120 seconds, bath temperature 25° C. Coating cured for 30 minutes at 180° C.; thickness 15 microns.
[2]Same as (1) but coating dried for 5 minutes at 130° C.
[3]Anti-gravelometer coating spray applied 15–20 microns in thickness; sealer coating spray applied wet-on-wet to anti-gravelometer coating.
[4]Sealer coating spray applied, cured for 22 minutes at 170° C.; 35 microns in thickness.
[5]Top coat spray applied, cured for 25 minutes at 140° C.; coating thickness 35 microns.
[6]Colored base coat spray applied, coating thickness 12 microns. Clear coating spray applied wet-on-wet on base coat, cured 25 minutes at 140° C.; coating thickness 35 microns.
[7]The chip resistance was determined according to the Renault 1081 method which involves 1 kg. of bolts dropped from a height of 5 meters onto a coated panel positioned at an angle of 45°. The numerical values presented in Table II refer to the percent chipping or flaking of the coating from the substrate. For example, 1 indicates about 10 percent flaking and 7 indicates about 70 percent flaking. The lower the value, the less flaking of the coating from the substrate and the better the chip resistance. The evaluation of "good", "fair" and "bad" in Table II is a visual subjective evaluation based on a microscopic examination of the diameter, depth and geometry of the individual impacts.

Example III

The following example compares four different coating systems for hardness and solvent resistance. The first system was an anionic electrodeposition primer without capped isocyanate groups and an epoxy resin-containing sealer applied to the primer via a dy-on-dry technique. The second coating system is similar to the first but with the exception that the sealer is applied to the primer via a wet-on-wet technique. The third coating system is similar to the first but with the primer being applied by cationic electrodeposition and containing blocked isocyanate groups. The fourth coating system is similar to the third but with the sealer being applied to the primer via a wet-on-wet technique. The results of the testing are summarized in Table III below:

TABLE III

| | Application Method | | | |
|---|---|---|---|---|
| | Dry-On-Dry | Wet-On-Wet | Dry-On-Dry | Wet-On-Wet |
| Coating | | | | |
| Primer | Ex. D[1] | Ex. D[2] | Ex. A[3] | Ex. A[4] |
| Sealer[5] | Ex. H | Ex. H | Ex. H | Ex. H |
| Test | | | | |
| Persoz Hardness in seconds | 220 | 198 | 280 | 306 |
| Xylene Resistance[6] | 2 minutes | 1½ minutes | 76 minutes | 76 minutes |
| Solvent (of Ex. I) Resistance | 10 seconds | 8 seconds | 20 seconds | 1 minute 40 seconds |

[1]Anionic electrodeposition primer applied to an iron phosphate pretreated steel substrate from a 12 percent solids electrodeposition bath at 280 volts for 120 seconds, bath temperature 27° C. Coating cured for 30 minutes at 180° C., thickness 25 microns.
[2]Same as (1) but coating dried for 5 minutes at 130° C.
[3]Cationic electrodeposition primer applied to an iron phosphate pretreated steel substrate from a 12 percent solids electrodeposition bath at 280 volts for 120 seconds, bath temperature 27° C. Coating cured for 30 minutes at 180° C., thickness 15 microns.
[4]Same as (3) but coating dried for 5 minutes at 130° C.
[5]Sealer spray applied, cured for 20 minutes at 180° C., coating thickness 35 microns.
[6]Solvent resistance was determined by placing a drop of xylene on cured coating and measuring the time for the coating to soften.

Example IV

The following example is for the purpose of determining the influence of the final cure temperature on hardness and solvent resistance of coatings applied via the wet-on-wet technique of the present invention. For the purposes of comparison, a sealer applied to a primer via a dry-on-dry technique and a sealer applied directly to the substrate without the first application of a primer were also evaluated. The results are summarized in Table IV below:

TABLE IV

| | Application Method | | | | |
|---|---|---|---|---|---|
| | Dry | Dry-On-Dry | Wet-On-Wet | Wet-On-Wet | Wet-On-Wet |
| Coating | | | | | |
| Primer | No | Ex. A[1] | Ex. A[2] | Ex. A[2] | Ex. A[2] |
| Sealer[3] | Ex. H | Ex. H | Ex. H | Ex. H | Ex. H |
| Schedule Sealer Cure | | | | | |
| | 19 min. at 200° C. | 19 min. at 200° C. | 19 min. at 200° C. | 20 min. at 180° C. | 20 min. at 150° C. |
| Test | | | | | |
| Persoz Hardness in seconds | | 290 | 290 | 310 | 306 | not determined |
| Solvent (of Ex. I) Resistance | 10 seconds | 30 seconds | 5 minutes | 40 seconds | 1 minute 8 seconds |

[1]Cationic electrodeposition primer applied to an iron phosphate pretreated steel substrate from a 20 percent solids electrodeposition bath at 280 volts for 120 seconds, bath temperature 25° C. Coating cured for 19 minutes at 200° C.; thickness 15 microns.
[2]Same as (1) but coating dried for 5 minutes at 130° C.
[3]Sealer spray applied, thickness 35 microns.

Example V

The following example is for the purpose of determining the influence of the amount of blocked isocyanate groups on solvent resistance of the cured coatings applied via a wet-on-wet technique of the present invention. The results of the testing are summarized in Table V below:

TABLE V

| Coating | | | | |
|---|---|---|---|---|
| Primer[1] | Ex. A | Ex. B | Ex. A | Ex. B |
| Sealer[2] | Ex. H | Ex. H | Ex. N | Ex. N |
| | % Latent NCO Group | | | |
| | 3.70 | 2.48 | 3.70 | 2.48 |
| Solvent (Ex. I) Resistance | 5 minutes 30 seconds | 3 minutes 45 seconds | 1 minute 15 seconds | 25 seconds |

[1]Cationic electrodeposition primer applied to an iron phosphate pretreated steel substrate from a 20 percent solids electrodeposition bath at 280 volts for 120 seconds, bath temperature 25° C. Coating dried for 5 minutes at 130° C., thickness 15 microns.
[2]Sealer spray applied, cured for 19 minutes at 200° C., thickness 35 microns.

Example VI

The following example compares two different capped isocyanate group-containing primers applied with sealers via a wet-on-wet technique. The results of the testing are summarized in Table VI below:

TABLE VI

| Coating | | |
|---|---|---|
| Primer | Ex. A[1] | Ex. C[2] |
| Sealer[3] | Ex. H | Ex. H |
| | % NCO Group | |
| | 3.70 | 5 |
| Test | | |
| Xylene Resistance | 6 minutes | 4 minutes |
| Solvent (of Ex. I) Resistance | 1 minute 30 seconds | 45 seconds |

[1]Cationic electrodeposition primer applied to an iron phosphate pretreated steel substrate from a 20 percent solids electrodeposition bath at 280 volts for 120 seconds, bath temperature 25° C. Coating was dried for 3 minutes at 120° C., thickness 15 microns.
[2]Cationic electrodeposition primer applied to an iron phosphate pretreated steel substrate from a 20 percent solids electrodeposition bath at 280 volts for 120 seconds, bath temperature 25° C. Coating was dried for 3 minutes at 120° C., thickness 15 microns.
[3]Sealer spray applied, cured for 17 minutes at 200°C., thickness 35 microns.
[4]Solvent resistance determined by first scratching coated panel and then placing a drop of solvent and measuring the time for coating to soften.

Example VII

The following example compares xylene resistance of epoxy resin group-containing sealers of various molecular weights. The sealers are applied to a capped isocyanate group-containing primer via wet-on-wet technique of the present invention. The results are summarized in Table VII below:

TABLE VII

| | Application Method | | | | | | | | | |
|---|---|---|---|---|---|---|---|---|---|---|
| Coating | Wet-On-Wet | Dry-On-Dry | Wet-On-Wet | Dry-On-Dry | Wet-On-Wet | Dry-On-Dry | Wet-On-Wet | Dry-On-Dry | Wet-On-Wet | Dry-On-Dry |
| Primer | Ex. A[1] | Ex. A[2] | Ex. A[1] | Ex. A[2] | Ex. A[1] | Ex. A[2] | Ex. A[1] | Ex. A[2] | Ex. A[1] | Ex. A[2] |
| Molecular Weight of Epoxy Resin[3] in Sealer | 530[4] | 530[4] | 377[5] | 377[5] | 1000[6] | 1000[6] | 4500[7] | 4500[7] | 1250[8] | 1250[8] |
| Xylene Resistance | 30 sec. | 1 min. 50 sec. | 30 sec. | 10 sec. | >6 min. | 1 min. | >6 min. | >6 min. | >6 min. | 2 min. 10 sec. |

[1] Cationic electrodeposition primer applied to an iron phosphate pretreated steel substrate from a 20 percent solids electrodeposition bath at 280 volts for 120 seconds, bath temperature 25° C. Coating was dried for 5 minutes at 130° C., thickness 15 microns.
[2] Same as (1) but coating cured for 30 minutes at 180° C.
[3] All epoxy resins are polyglycidyl ethers of bisphenol A dissolved in a mixture of organic solvents (25 parts SOLVESSO 100, 2-butoxyethanol and 2-ethoxyethylacetate) to a No. 4 Ford cup viscosity of 25 to 30 seconds and applied to obtain a 35-micron film.
[4] Commercially available as EPIKOTE 834.
[5] Commercially available as EPIKOTE 828.
[6] Commercially available as EPIKOTE 1001.
[7] Commercially available as EPIKOTE 1007.
[8] Commercially available as ARALDITE 7072.

Example VIII

The following example compares various sealers with different functional groups. The sealers are applied to capped isocyanate group-containing polymers via the wet-on-wet technique. One sealer contained only hydroxyl groups derived from a styrene-allyl alcohol copolymer. A second sealer contained only primary amine groups derived from an ammonia defunctionalized epoxy resin. The third sealer contained only epoxy groups derived from a polyglycidyl ether of bisphenol A. The results of the testing are summarized in Table VIII below:

TABLE VIII

| | Application[1] | | | | | | | | |
|---|---|---|---|---|---|---|---|---|---|
| Coating | 350° F. (177° C.) 30 min. | 250° F. (121° C.) 5 min. | Air Dry | 350° F. (177° C.) 30 min. | 250° F. (121° C.) 5 min. | Air Dry | 350° F. (177° C.) 30 min | 250° F. (121° C.) 5 min. | Air Dry |
| Primer[2] | Ex. A | Ex. A | Ex. A | Ex. A | Ex. A | Ex. A | Ex. A | Ex. A | Ex. A |
| Sealer[3] | Ex. O | Ex. O | Ex. O | Ex. P | Ex. P | Ex. P | Ex. Q | Ex. Q | Ex. Q |
| Acetone Resistance[4] | 6 | 6 | 6 | 13 | 10 | 10 | 100 | 100 | 100 |

[1] Temperature and time of curing of drying primer coating.
[2] Cationic electrodeposition primer applied to a zinc phosphate pretreated steel substrate from a 20 percent solids electrodeposition bath at 200 volts for 3 minutes, bath temperature 78° F. (26° C.), coating thickness 15 microns.
[3] Sealer drawn down over primer and cured at 350° F. (177° C.) for 30 minutes, thickness 37.5 microns.
[4] Number of double rubs using normal hand pressure with an acetone-saturated cloth required to soften the coating.

Example IX

The following example compares various primers with and without blocked isocyanate functionality and sealers with and without epoxy functionality. One of the primers containing blocked isocyanate functionality was spray applied to a substrate, a second primer also with blocked isocyanate functionality was cationically electrodeposited on the substrate and the third primer without blocked isocyanate functionality was also applied to the substrate by cationic electrodeposition. Three sealer compositions were used. One sealer container epoxy functionality derived from a polyglycidyl ether of bisphenol A and had an epoxy equivalent weight of about 475. The second sealer was a phenol-defunctionalized epoxy resin and the third sealer was an acrylic polymer prepared with glycidyl methacrylate. The results of the testing are summarized in Table IX below.

TABLE IX

| | Application | | | | | | | | |
|---|---|---|---|---|---|---|---|---|---|
| Coating and Thickness | Air Dry | | | 250° F. (121° C.) 5 minutes | | | 360° F. (182° C.) 20 minutes | | |
| Thickness | | | | | | | | | |
| Primer[1] (0.4 mil) | Ex. E | Ex. E | Ex. E | Ex. E | Ex. E | Ex. E | Ex. E | Ex. E | Ex. E |
| Sealer[2] (0.8–1.0 mil) | Ex. R | Ex. S | Ex. T | Ex. R | Ex. S | Ex. T | Ex. R | Ex. S | Ex. T |
| Acetone Resistance | >100 | <10 | >100 | >100 | <10 | 65 | <10 | <10 | <10 |
| Primer (0.7 mil) | Ex. E | Ex. E | Ex. E | Ex. E | Ex. E | Ex. E | Ex. E | Ex. E | Ex. E |
| Sealer[2] (0.6–0.7 mil) | Ex. R | Ex. S | Ex. T[4] | Ex. R | Ex. S | Ex. T | Ex. R | Ex. S | Ex. T |
| Acetone Resistance | >100 | >100[5] | >100 | >100 | >100[5] | >100 | <10 | <10 | <10 |
| Primer[3] (0.5–0.75 mil) | Ex. F | Ex. F | Ex. F | Ex. F | Ex. F | Ex. F | Ex. F | Ex. F | Ex. F |
| Sealer[2] (0.6–0.7 mil) | Ex. R | Ex. S[7] | Ex. T | Ex. R | Ex. S[8] | Ex. T | Ex. R | Ex. S[9] | Ex. T |
| Acetone Resistance | >100[5] | <10 | <10 | >100 <10 | 10–15 | <10 | <10 | <10 | |
| Primer[3] (0.6–0.7 mil) | Ex. A | Ex. A | Ex. A | Ex. A | Ex. A | Ex. A | Ex. A | Ex. A | Ex. A |
| Sealer[2] (0.5–0.8 mil) | Ex. R | Ex. S | Ex. T | Ex. R | Ex. S | Ex. T | Ex. R | Ex. S[10] | Ex. T[11] |
| Acetone Resistance | >100 | 10–20 | 35 | >100 | 15–25 | 60 | >100 | 10–20 | 10 |
| Sealer[6] | Ex. R | Ex. S | Ex. T | Ex. R | Ex. S | Ex. T | Ex. R | Ex. S | Ex. T |

TABLE IX-continued

| Coating and Thickness | Application | | | | | | | | |
|---|---|---|---|---|---|---|---|---|---|
| | Air Dry | | | 250° F. (121° C.) 5 minutes | | | 360° F. (182° C.) 20 minutes | | |
| Thickness Acetone Resistance | <10 | <10 | <10 | <10 | <10 | <10 | <10 | <10 | <10 |

[1] Spray applied to zinc phosphate pretreated steel panel.
[2] All sealers spray applied and cured at 360° F. (182° C.) for 30 minutes.
[3] Applied by cationic electrodeposition to zinc phosphate pretreated substrate at 200 volts for 3 minutes, bath temperature 78° F. (26° C.).
[4] 1.4 Mil thickness.
[5] Degree of cure unexpected, believed to be due to sealer "striking in" and intermixing with primer.
[6] Sealer spray applied directly to zinc phosphate pretreated steel substrate.
[7] 1.5 Mils thickness.
[8] 1.25 Mils thickness.
[9] 0.9 Mil thickness.
[10] 1.95 Mils thickness.
[11] 0.95 Mil thickness.

We claim:

1. A process for coating a substrate comprising:
   (A) applying to a substrate at least two coating compositions, at least one of which contains capped polyisocyanate functionality with no free isocyanate groups, and at least one of which contains 1,2-epoxy functionality; said coating compositions being applied to the substrate sequentially without having first cured the initially applied coating and being continuously superimposed upon one another so as to form a multilayered coating;
   (B) heating the coated substrate to a temperature sufficient to cure the multilayered coating.

2. A process for coating a substrate comprising:
   (A) applying to a substrate a first coating composition containing a capped isocyanate functionality with no free isocyanate groups to form a first coating thereon,
   (B) applying to said first coating prior to curing, a second coating composition containing 1,2-epoxy functionality, said coating composition being continuously superimposed upon the first coating so as to form a multilayered coating,
   (C) heating the coated substrate to a temperature sufficient to cure the multilayered coating.

3. The process according to claim 1 in which the substrate is metal.

4. The process according to claim 2 in which the substrate is metal.

5. The process according to claims 3 or 4 in which the metal is steel.

6. The process according to claim 2 in which the first coating composition is an aqueous-based composition.

7. The process according to claim 6 in which the first coating composition contains cationic salt groups.

8. The process according to claim 7 in which the first coating composition is an acid-solubilized polyepoxide-amine adduct.

9. The process according to claims 1 or 2 in which the capped isocyanate is derived from an aromatic polyisocyanate.

10. The process according to claim 9 in which the aromatic polyisocyanate is toluene diisocyanate.

11. The process according to claims 1 or 2 in which the capping agent is an alcohol containing from 2 to 10 carbon atoms.

12. The process according to claim 11 in which the alcohol is selected from the class consisting of 2-ethylhexanol and 2-butoxyethanol.

13. The process according to claims 1 or 2 in which the isocyanate is present in the film-forming composition as a fully capped organic polyisocyanate.

14. The process of claims 1 or 2 which contains from 2 to 10 percent isocyanate functionality based on weight of resin solids of the coating composition.

15. The process of claim 1 in which the 1,2-epoxy functionality containing coating composition contains a polyepoxide.

16. The process of claim 2 in which the 1,2-epoxy functionality containing coating composition contains a polyepoxide.

17. The process of claims 15 or 16 in which the polyepoxide has a molecular weight of at least about 800.

18. The process of claims 15 or 16 in which the polyepoxide is a polyglycidyl ether of a cyclic polyol.

19. The process of claims 1 or 2 in which the 1,2-epoxy functionality containing coating composition comprises a mixture of a polyepoxide and a polymer selected from the class consisting of alkyd resins, saturated polyesters and acrylic polymers.

20. The process of claim 2 in which the second coating composition is organic solvent based.

21. The process of claim 2 in which the first coating composition is applied by electrodeposition.

22. The process of claim 21 in which the electrodeposition is cationic electrodeposition.

23. The process of claim 2 in which the second coating composition is applied by spraying.

24. The process of claims 1 or 2 which includes a drying step between coating applications.

25. The process of claim 1 which includes the step of applying a coating composition after (B) and curing said coating composition.

26. The process of claim 2 which includes the step of applying a third coating composition after (B); said third coating composition containing heat-reactive curing groups.

27. A coated article produced by the process of any of claims 1, 2, 3, 4, 6, 7, 8, 15, 16, 20, 21, 22, 23, 25 or 26.

28. The process of claims 1 or 2 in which the coating composition containing 1,2-epoxy functionality is applied by spraying, brushing, roll coating, drawing down, dipping, or flow coating.

29. The process of claims 1 or 2 wherein the coating composition containing 1,2-epoxy functionality is applied by spraying.

30. A coated article produced by the process of claim 28.

31. A coated article produced by the process of claim 29.

* * * * *

UNITED STATES PATENT AND TRADEMARK OFFICE
CERTIFICATE OF CORRECTION

PATENT NO.   : 4,375,498

DATED        : March 1, 1983

INVENTOR(S)  : Jean-Jacques Le Minez and Bernard Schmitt

It is certified that error appears in the above-identified patent and that said Letters Patent are hereby corrected as shown below:

On The Title Page, "Foreign Application Priority Data", "February 9, 1980" should be --September 2, 1980--.

Signed and Sealed this

Seventh Day of June 1983

[SEAL]

Attest:

DONALD J. QUIGG

Attesting Officer

Acting Commissioner of Patents and Trademarks